(12) United States Patent  
Albrecht et al.

(10) Patent No.: US 9,031,900 B2  
(45) Date of Patent: May 12, 2015

(54) SYSTEM AND METHODS FOR INTEGRATING SOFTWARE LAYERS FOR OLAP

(75) Inventors: Zoltan Albrecht, Karlsruhe (DE); Sebastian Schroetel, Sinsheim (DE)

(73) Assignee: SAP SE, Walldorf, DE (US)

( * ) Notice: Subject to any disclaimer, the term of this patent is extended or adjusted under 35 U.S.C. 154(b) by 72 days.

(21) Appl. No.: 13/353,112

(22) Filed: Jan. 18, 2012

(65) Prior Publication Data

US 2013/0185250 A1     Jul. 18, 2013

(51) Int. Cl.
*G06F 17/30*     (2006.01)

(52) U.S. Cl.
CPC ................................. *G06F 17/30592* (2013.01)

(58) Field of Classification Search
CPC ..................... G06F 17/30569; G06F 17/30592
USPC .......... 707/600, 602, 607, 705, 706, 770, 778, 707/807, 810, 779, 793, 803, 809
See application file for complete search history.

(56) References Cited

U.S. PATENT DOCUMENTS

2005/0060326 A1*   3/2005   Bakalash et al. .............. 707/100
2013/0110971 A1*   5/2013   Williams et al. .............. 709/217

* cited by examiner

*Primary Examiner* — Greta Robinson
(74) *Attorney, Agent, or Firm* — Brake Hughes Bellermann LLP (57) ABSTRACT

In accordance with aspects of the disclosure, a system and methods may be provided for integrating software layers in OLAP including receiving, at an OLAP engine, a dynamic result set structure passed from an application layer via one or more other software layers. The dynamic result set structure may include a description of entities for a target layer. The system and methods may include enhancing raw data, at the OLAP engine, acquired from a database associated with a source layer based on the description of entities for the dynamic result set structure and passing one or more references to one or more memory locations for data elements in the dynamic result set structure from the OLAP engine to the application layer via the one or more other software layers for acquiring each data element associated with each corresponding reference in the dynamic result set structure.

20 Claims, 4 Drawing Sheets

Query Result

0BWVC_C03      Last Data Update: 13.07.2010 15:08:51

| 0VC_COUN | | 0VC_TYPE | 0VC_AMT | 0VC_DATE | 0VC_MAX | 0VC_MIN | 0VC_ORD | 0VC_ZHL |
|---|---|---|---|---|---|---|---|---|
| AUS | Australia | AUS/1 | 5,941,30 DM | X | 218 ST | 1,0 ST | 1 | 106,000 |
| | | AUS/A | 39,291,05 DM | X | 224 ST | 0,0 ST | 1 | 701,000 |
| | | AUS/C | 4,784,25 DM | X | 224 ST | 4,0 ST | 1 | 85,000 |
| | | Result | 49,996,60 DM | X | 224 ST | 0,0 ST | 1 | 892,000 |
| DE | Germany | DE/3 | 423.816,56 DM | X | 1,071,970 KG | 1,0 KG | 2 | 108,000 |
| | | DE/A | 2.881.644,32 DM | X | 1,183,430 KG | 0,3 KG | 2 | 778,000 |
| | | DE/C | 294.538,20 DM | X | 904,910 KG | 4,3 KG | 2 | 95,000 |
| | | Result | 3,599,999,08 DM | X | 1,183,430 KG | 0,3 KG | 2 | 981,000 |
| Overall Result | | | 3,649,995,68 DM | X | * | * | 3 | 1873,000 |

FIG. 4

SYSTEM AND METHODS FOR INTEGRATING SOFTWARE LAYERS FOR OLAP

TECHNICAL FIELD

This description relates to integrating software layers for Online Analytical Processing (OLAP).

BACKGROUND

In conventional OLAP systems, raw data is stored in database tables. This data is accessed by a data abstraction layer to unify different types of persistency models to one common interface. Layers above the data abstraction layer include an OLAP calculation engine and one or more client access layers. A complex result set computed by the OLAP engine may be subsequently copied and transformed from layer to layer. In layers above the OLAP engine, there is typically no semantic advantage to multi-layer transformations, but this is done because every layer has its own proprietary way of defining a structure of the result set.

Unfortunately, the repeated copying of the data itself occupies computer memory multiple times and the repeated transforming of the data is substantially time consuming and usually dominates the query execution time. As such, there exists a need to improve the process by which multidimensional data is accessed and processed.

SUMMARY

In accordance with aspects of the disclosure, an engine system may be provided for an OLAP system including instructions recorded on a computer-readable medium and executable by at least one processor. The engine may include a request handler configured to cause the at least one processor to receive, at the engine system, a dynamic result set structure passed from an application layer via one or more other software layers. The dynamic result set structure may include a description of entities for a target layer. The engine system may include a data handler configured to cause the at least one processor to enhance raw data acquired from a database associated with a source layer based on the description of entities for the dynamic result set structure. The engine system may include a response handler configured to cause the at least one processor to pass one or more references to one or more memory locations for data elements in the dynamic result set structure to the application layer via the one or more other software layers for acquiring each data element associated with each corresponding reference in the dynamic result set structure.

In accordance with aspects of the disclosure, a computer program product may be provided, wherein the computer program product is tangibly embodied on a computer-readable storage medium and includes instructions that, when executed by a processor, are configured to receive, at an engine system, a dynamic result set structure passed from an application layer via one or more other software layers. The dynamic result set structure may include a description of entities for a target layer. The computer program product may include instructions that, when executed by the processor, are configured to enhance raw data acquired from a database associated with a source layer based on the description of entities for the dynamic result set structure. The computer program product may include instructions that, when executed by the processor, are configured to pass one or more references to one or more memory locations for data elements in the dynamic result set structure to the application layer via the one or more other software layers for acquiring each data element associated with each corresponding reference in the dynamic result set structure.

In accordance with aspects of the disclosure, a computer-implemented method may be provided for integrating a plurality of software layers in an OLAP system. The computer-implemented method may include receiving, at an engine system, a dynamic result set structure passed from an application layer via one or more other software layers. The dynamic result set structure may include a description of entities for a target layer. The computer-implemented method may include enhancing raw data acquired from a database associated with a source layer based on the description of entities for the dynamic result set structure. The computer-implemented method may include passing one or more references to one or more memory locations for data elements in the dynamic result set structure to the application layer via the one or more other software layers for acquiring each data element associated with each corresponding reference in the dynamic result set structure.

The details of one or more implementations are set forth in the accompanying drawings and the description below. Other features will be apparent from the description and drawings, and from the claims.

DETAILED DESCRIPTION

Figure 1:
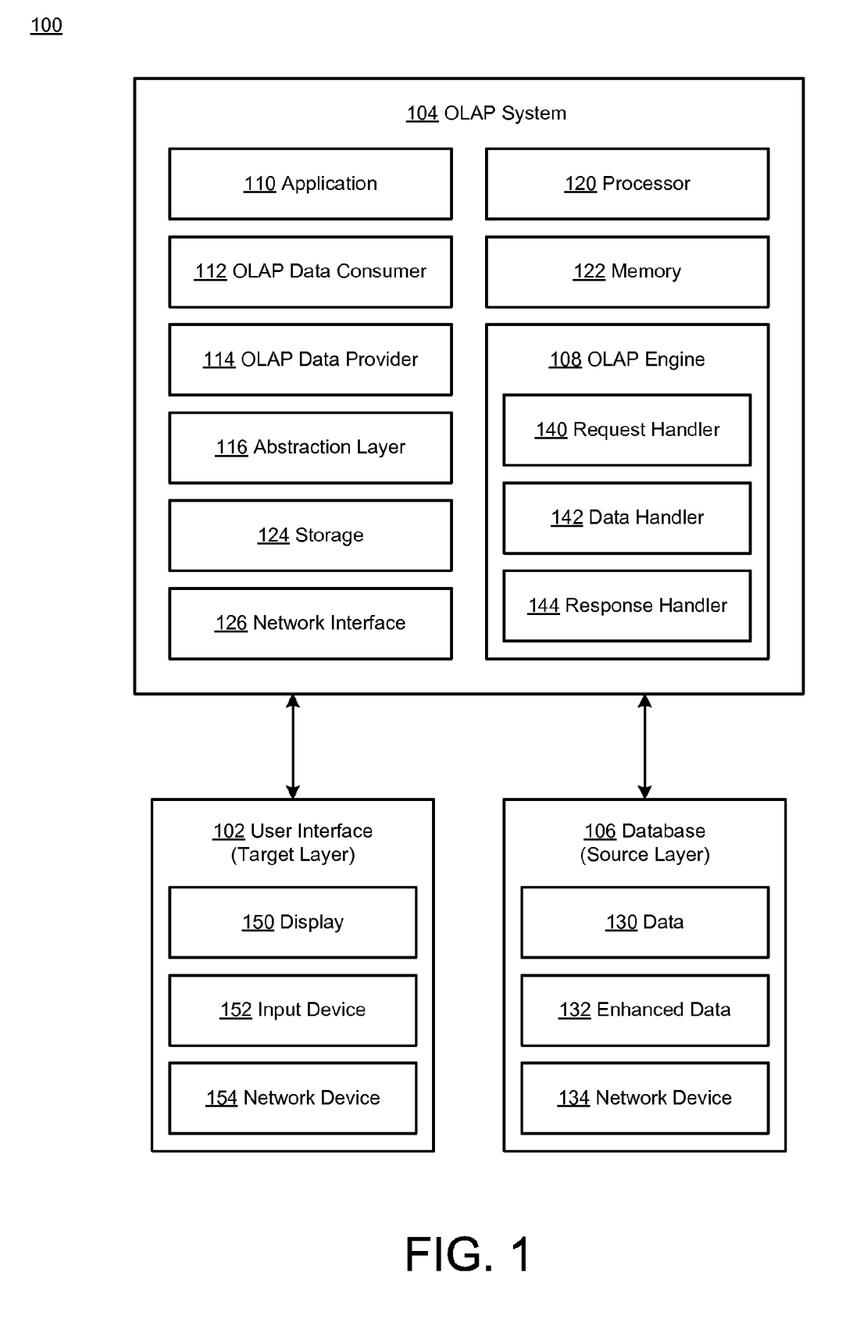
FIG. 1 is a block diagram illustrating an example system for integrating software layers in an OLAP system.

FIG. 1 is a block diagram of a system 100 for integrating software layers in an Online Analytical Processing (OLAP) system. OLAP technology is used to analyze multidimensionally modeled data quickly and interactively from multiple perspectives according to management needs of a user, such as a decision maker. Databases configured for OLAP technology utilize a multidimensional data model or structure for organizing data and identifying relationships between data. The multidimensional data model or structure is provided in cubes for aggregated data storage and access within the dimensions of each cube. Data modeled in the multidimensional data model or structure is viewable from different perspectives, which allows for highly complex analytical queries with rapid execution time.

The system 100 includes a user interface (UI) 102 as a target layer that manages input and output for a user, including user input via an input device 152 of user queries or other multidimensional requests and output display via a display 150 of the results of the multidimensional queries or requests. The UI 102 is configured to interface with the OLAP system 104 over a network via a network interface 154.

The UI 102 may be implemented using any appropriate combination of hardware and/or software configured for wired and/or wireless communication over the network. In various examples, the UI target layer 102 may be implemented as a personal computer (PC), a notebook computer, a tablet computer, a personal digital assistant (PDA), a wireless mobile device, and/or various other generally known types of wired and/or wireless computing devices for communication with the network. It should be appreciated that the UI 102 may be referred to as a client device without departing from the scope of the disclosure. The UI 102 may include a bus or other communication mechanism for communicating data and information between interconnected subsystems and components, such as a processor (e.g., micro-processor, micro-controller, digital signal processor (DSP), etc.), memory (e.g., RAM), storage (e.g., ROM), the display 150 (e.g., CRT or LCD), the input device 152 (e.g., keyboard, touch screen, cursor controller), and the network interface 154 (e.g., modem or Ethernet device).

The system 100 includes an OLAP system 104 having an OLAP engine 108 for managing one or more applications 110, such as computer programs. The OLAP system 104 includes at least one processor 120, memory 122, and storage 124, which may be used to store the one or more applications 110 configured for online analytical processing and authorization information related to user access. The processor 120 may be configured to interface with the OLAP engine 108 for executing the one or more applications 110 to control the OLAP system 104. The OLAP system 104 is configured to interface with the UI target layer 102 and a database source layer 106 over the network via a network interface 126. Further, as described herein, the OLAP engine 108 is configured to seamlessly integrate different software layers of the OLAP system 104 without having to the leave the boundaries of the OLAP system 104.

The OLAP system 104 may be implemented using appropriate computing system functionality including any appropriate combination of hardware and/or software suitable for implementing various aspects of the disclosure. For example, the OLAP system 104 may comprise a network computing device (e.g., a network server) capable of communicating with the UI 102 and the database 106 over the network. The OLAP system 104 may include a bus or other communication mechanism for communicating information between interconnected subsystems and components, such as the processor 120 (e.g., microprocessor, microcontroller, digital signal processor (DSP), etc.), system memory 122 (e.g., RAM), static storage 124 (e.g., ROM), and the network interface 126 (e.g., modem or Ethernet device). In an example, execution of instruction sequences to implement various aspects of the disclosure may be performed by one or more components of the OLAP system 104 including the OLAP engine 108 in coordination with one or more other components of the OLAP system 104, as described herein.

The system 100 includes the database 106 as a source layer that manages data independently from the OLAP system 104. The database 106 is configured to store multidimensional transactional data 130 and enhanced data 132 related to a dynamic result set structure, which is described further herein. The database 106 is configured to interface with the OLAP system 104 over the network via a network interface 134.

The database 106 may be implemented using any appropriate combination of hardware and/or software configured for database functionality including wired and/or wireless communication over the network. For example, the database 106 may comprise a network computing device (e.g., a network database server) capable of communicating with the OLAP system 104 over the network. The database 106 may include a bus or other communication mechanism for communicating information between interconnected subsystems and components, such as a processor (e.g., micro-processor, micro-controller, digital signal processor (DSP), etc.), memory (e.g., RAM), storage (e.g., ROM, disk drives, etc.), and the network interface 134 (e.g., modem or Ethernet device).

In an aspect of the disclosure, the network may be implemented as a single network or a combination of multiple networks. For example, the network may include a wireless communications network adapted for communication with one or more other communication networks, such as the Internet. In other examples, the network may include the Internet, one or more intranets, landline networks, wireless networks, and/or one or more other appropriate types of communication networks. As such, in various implementations, the user interface 102, the OLAP system 104, the database 106 may be associated with a particular link (e.g., a link, such as a URL (Uniform Resource Locator) to an IP (Internet Protocol) address).

In the example of FIG. 1, the OLAP system 104 may represent virtually any self-contained, developer-specific, provider-specific, and/or otherwise highly customized or specialized software system that is designed and configured for deployment in a particular context or setting and for associated execution of functionality designed to satisfy particular needs of the system 100 within that context.

For instance, the OLAP system 104 may represent software products or software suites of a particular software provider, which has been configured for a deployment within the context of a particular purchasers or other customer or consumer of the software in question. In the examples provided herein, e.g., with respect to FIGS. 2-4, the OLAP system 104 may represent or include business warehouse (BW) software provided by SAP AG of Walldorf, Germany. However, the OLAP system 104 may represent virtually any such similar software which may be provided by SAP AG or other existing or future providers of software-based enterprise solutions for businesses hoping to increase their productivity and/or efficiency (and thus their profitability and other performance metrics) through the use of such software. As such, it should be appreciated that, in any case, these are merely examples, and that the OLAP system 104 may represent virtually any self-contained, internally-consistent software system provided by a software provider or other entity for use by a user of the OLAP system 104.

In the example of FIG. 1, the OLAP system 104 includes the OLAP engine 108, which may be referred to as an engine system, including instructions recorded on a computer-readable medium, such as the memory 122 and/or storage 124, and executable by the at least one processor 120. The OLAP engine 108 is a component of the OLAP system 104 positioned between the user interface (UI) target layer 102 and the database source layer 106. The OLAP engine 108 provides multidimensionally formatted data to a front end and to third-party administrator front ends using special interfaces. The OLAP engine 108 may be optimized for analyzing and reporting large datasets, wherein users may request special individual views or perspectives of multidimensional data.

The OLAP engine 108 may include a request handler 140 configured to cause the at least one processor 120 to receive, at the OLAP engine 108, a dynamic result set structure passed from the application layer 110 via one or more other software layers, such as an OLAP consumer layer 112 and/or an OLAP provider layer 114. Each software layer including, for example, the layers 112 and 114 in the OLAP system 104 supports the dynamic result set structure, and no boundaries exist between the software layers of the OLAP system 104.

In an example, the OLAP data consumer 112 is a software layer that is part of the OLAP system 104 and/or application code provided by the OLAP system 104. The OLAP consumer 112 may be configured to access data stored in the database source layer 106. In another example, the OLAP data provider 114 is a software layer that is part of the OLAP system 104 and/or application code provided by the OLAP system 104. The OLAP data provider 114 may be configured to model data from the data source (i.e., database 106) as a rowset in tabular form. One or more other software layers may be provided including a service layer that is configured to provide services for functions needed by the OLAP data consumer 112.

In an aspect of the disclosure, the dynamic result set structure may include a description of entities (e.g., preconfigured knowledge of a type of data retrieved or for retrieval) for the UI target layer 102. In some implementations, the description of entities may include information related to OLAP entities associated with the OLAP system 104 including one or more of data hierarchies, data aggregations, and data exceptions. For the OLAP system 104, queries are the basis of analysis, and to define a multidimensional request, a query utilizes the dynamic result set structure to formulate individual requests on the basis of multidimensionally modeled datasets. In the example of FIG. 1, the OLAP engine 108 provides the functionality for retrieving, handling, processing, and formatting the multidimensional data in the dynamic result set structure from various views or perspectives requested by the UI target layer 102.

Hierarchies may be defined by an organizational form that refers to an arrangement or ordered set of items (e.g., objects, categories, values, names, etc.) in a database that may be represented as above, below, or at the same level of other items in the database. Hierarchy in a database may further refer to linked entities in a same path as tiered data elements, such as superiors or subordinates, directly or indirectly, and in a vertical or horizontal ordered arrangement.

Aggregations may be defined by an organizational form that refers to a collection of items in a database that are gathered together to form a quantity, either in totality or some part thereof. Aggregation in a database may further refer to a part of a dimensional model that is used to improve query time by summarizing tables.

Exceptions may be defined by determining threshold values or intervals that are given a priority (e.g., bad, critical, good, etc.). In an example, a priority given to an exception may correspond to pre-assigned colors that become more intense for greater deviation. For instance, a plurality of different shades of traffic light colors, such as red, yellow, and green, may be utilized in an alert monitor to display results of exception reporting. Exceptions may also be defined by determining one or more cell restrictions for specifying an evaluation (i.e., cell area) for exception application.

Exceptions may refer to exception reporting that may provide for selecting and/or highlighting objects that may be different or considered critical. In an example, results that may fall outside of a set of predetermined threshold values (i.e., exceptions) may be highlighted in color. As such, results that deviate from expected results may be immediately identified. Further, exception reporting may provide for determining objects that are considered critical for a query in online and background processing.

Conditions may be formulated to provide efficient data analysis. For example, in a results area of a query, data may be filtered according to one or more conditions so that only part of the results area is displayed. If one or more conditions are applied to a query, number are not changing, and instead, numbers that are not relevant are hidden from display. As such, conditions may have no effect on displayed values of results rows of a query with an active condition, which may correspond to the results row of a query without this particular condition.

Multiple conditions may be defined for a query, wherein conditions may be evaluated independently of each other condition, and a results quantity for an evaluation sequence may be independent. The result may be an intersection of individual conditions. Multiple conditions may be linked logically with AND, and a characteristic value may only be displayed when all (active) conditions of a query are fulfilled.

The OLAP engine 108 may include a data handler 142 configured to cause the at least one processor 120 to enhance raw data 130 acquired from the database 106 associated with the source layer based on the description of entities for the dynamic result set structure. In an implementation, the data handler 142 may be configured to cause the at least one processor 120 to acquire the raw data 130 from the database 106 associated with the source layer via an abstraction layer 116. In another implementation, the data handler 142 may be configured to cause the at least one processor 120 to store the enhanced raw data 132 in the one or more memory locations of the database 106 associated with the dynamic result set structure. As described further herein, the enhanced raw data 132 of the dynamic result set structure includes a private area and an application specific area including the reference to the memory location for each data element in the dynamic result set structure.

In an example, the abstraction layer 116 may refer to generalizations of a model or algorithm separate from any specific implementation. These generalizations may arise from broad similarities encapsulated by models that express similarities present in various specific implementations. Simplification provided by abstraction allows for easy reuse of data by distilling a useful concept or metaphor so that situations where data may be accurately applied is quickly recognizable. The abstraction layer 116 may be configured to generalize abstract concepts while allowing specificity when and where the abstraction breaks down, and successful application of abstraction may be customized for each specific requirement or problem. The abstraction layer 116 may be positioned between the OLAP engine 108 and the database 106 to simplify any complexity of data structures and technical names used by the database 106. The abstraction layer 116 enables the OLAP engine 108 to access, interact, and analyze data in the database 106 regardless of underlying data sources and schemas thereof. The abstraction layer 116 may encompass one or more of database connectivity parameters, universes, query panel, query generation, calculator, and local cache.

The OLAP engine 108 may include a response handler 144 configured to cause the at least one processor 120 to pass one or more references to one or more memory locations in the aggregated result for data elements in the dynamic result set structure to the application layer 110 via the one or more other software layers, such as 112 and/or 114, for acquiring each data element associated with each corresponding reference in the dynamic result set structure. In an aspect of the disclosure, the one or more references point to the aggregated result set of the OLAP engine 108. The data elements of the dynamic result set structure may include multidimensional transactional data elements. Each data element of the dynamic result set structure may exist only once in memory of the database 106.

Figure 2:
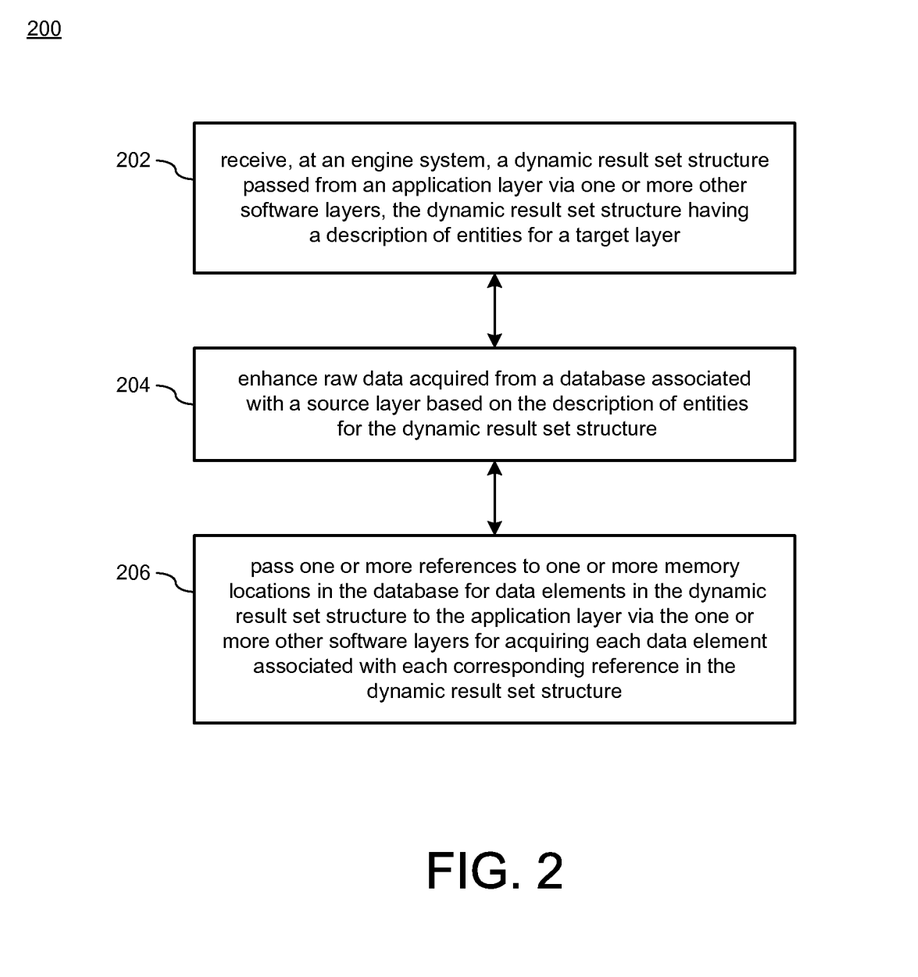
FIG. 2 is a process flow illustrating an example method for integrating software layers in an OLAP system.

FIG. 2 is a process flow illustrating an example of a method 200 for integrating software layers in an OLAP system. In the example of FIG. 2, operations 202-206 are illustrated as discrete operations occurring in sequential order. However, it should be appreciated that, in other implementations, two or more of the operations 202-206 may occur in a partially or completely overlapping or parallel manner, or in a nested or looped manner, or may occur in a different order than that shown. Moreover, additional operations, not specifically illustrated in the example of FIG. 2, also may be included in some implementations, while, in other implementations, one or more of the operations 202-206 may be omitted.

In the example of FIG. 2, the method 200 may include a process flow for a computer-implemented method for integrating a plurality of software layers in the OLAP system of FIG. 1. Further, as described herein, the operations 202-206 generally provide a simplified operational process flow that may be enacted by the OLAP engine 108 to provide features and functionalities as described in reference to FIG. 1.

At 202, the method 200 may include receiving, at an engine system (e.g., OLAP engine 108), a dynamic result set structure passed from an application layer (e.g., application layer 110) via one or more other software layers (e.g., OLAP consumer layer 112 and/or OLAP provider layer 114). The dynamic result set structure may include a description of entities for a target layer (e.g., UI target layer 102). The description of entities may include information related to preconfigured knowledge of a type of data retrieved or for retrieval. In an implementation, receiving the dynamic result set structure may include receiving instructions for a filling instance on semantics for the dynamic result set structure. Each software layer in the OLAP system supports the dynamic result set structure, and no boundaries exist between the software layers of the OLAP system.

In an example, semantics may refer to meanings of data instances and may refer to rules for interpreting meanings of data, such as an interpretation of an data instance or expression. Semantics may further refer to a specific type of data structure that may be used for representing a content of information. In an aspect, a semantic data model may comprise a conceptual data model in which semantic related information is included as part thereof, wherein the semantic data model provides a meaning and/or interpretation of data instances. The semantic data model may also refer to an abstraction that defines relationships of the stored data instance. In another aspect, a semantic data model may comprise a conceptual data model that includes an expression of information to enable information exchange for interpreting semantic meanings from data instances, without knowledge of a meta-model. Semantic data models may be referred to as fact oriented data models instead of object oriented data models, wherein facts may be expressed by binary relations between data elements, whereas some higher order relations may be expressed as collections of binary relations. Further, some data instances of semantic data models may include relationship types between data elements.

Referring to the example of FIG. 2, at 204, the method 200 may include enhancing raw data acquired from a database (e.g., database 106) associated with a source layer based on the description of entities for the dynamic result set structure.

At 206, the method 200 may include passing one or more references to one or more memory locations in the aggregated result for data elements in the dynamic result set structure to the application layer (e.g., application layer 110) via the one or more other software layers (e.g., OLAP data consumer layer 112 and/or OLAP data provider layer 114) for acquiring each data element associated with each corresponding reference in the dynamic result set structure. In an aspect of the disclosure, the one or more references point to the aggregated result set of the OLAP engine 108. As described herein, the data elements of the dynamic result set structure may include multidimensional transactional data elements. Further, the description of entities may include information related to OLAP entities associated with the OLAP system including one or more of data hierarchies, data aggregations, and data exceptions.

In an implementation, the method 200 may further include acquiring the raw data from the database (e.g., database 106) associated with the source layer via an abstraction layer (e.g., abstraction layer 116). In another implementation, the method 200 may further include storing the enhanced raw data in the one or more memory locations of the database (e.g., database 106) associated with the dynamic result set structure. The enhanced raw data may be stored in the one or more memory locations of the database associated with the dynamic result set structure so that each data element of the dynamic result set structure exists only once in memory of the database. The enhanced raw data may be stored in the one or more memory locations of the database associated with the dynamic result set structure so that the enhanced raw data of the dynamic result set structure has a private area and an application specific area including the reference to the memory location for each data element in the dynamic result set structure.

Figure 3:
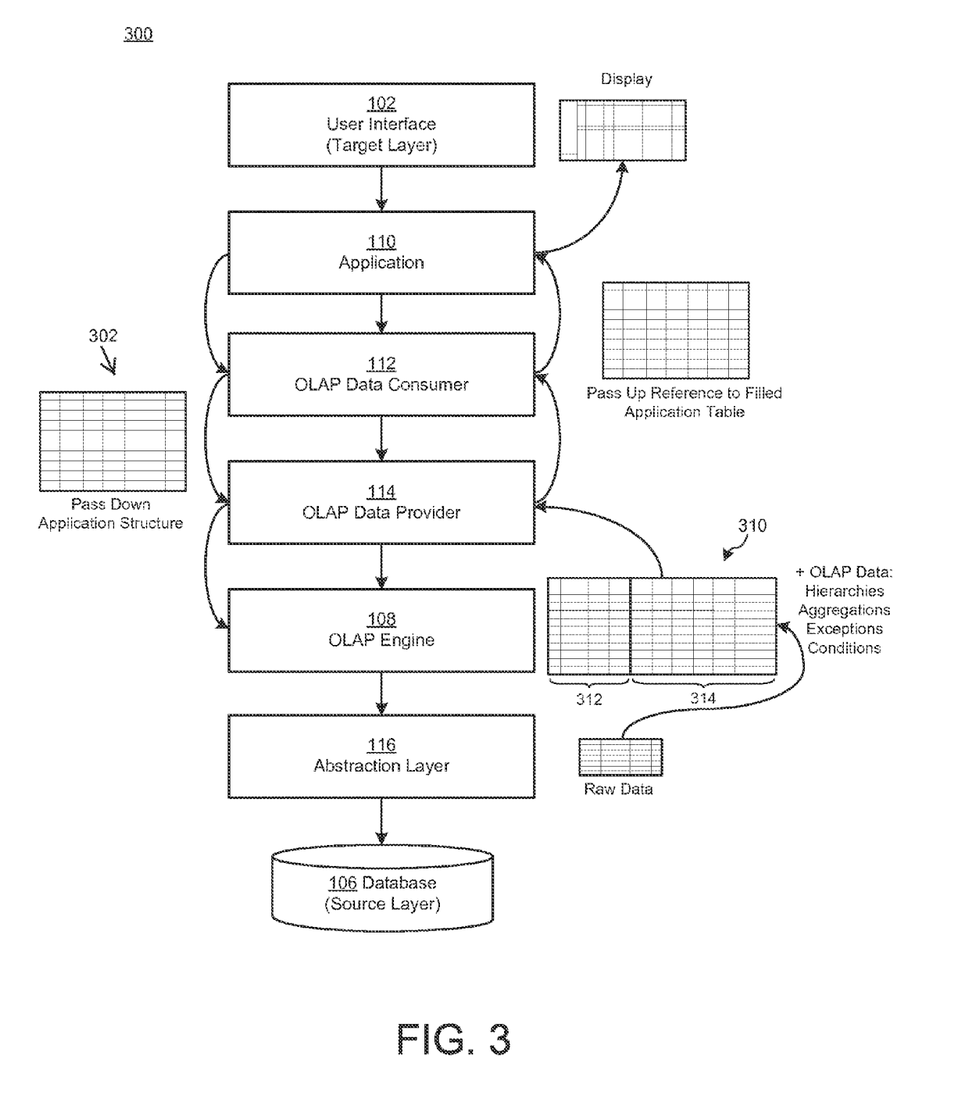
FIG. 3 is a process flow illustrating a more detailed example method for integrating software layers in an OLAP system.
Figure 4:
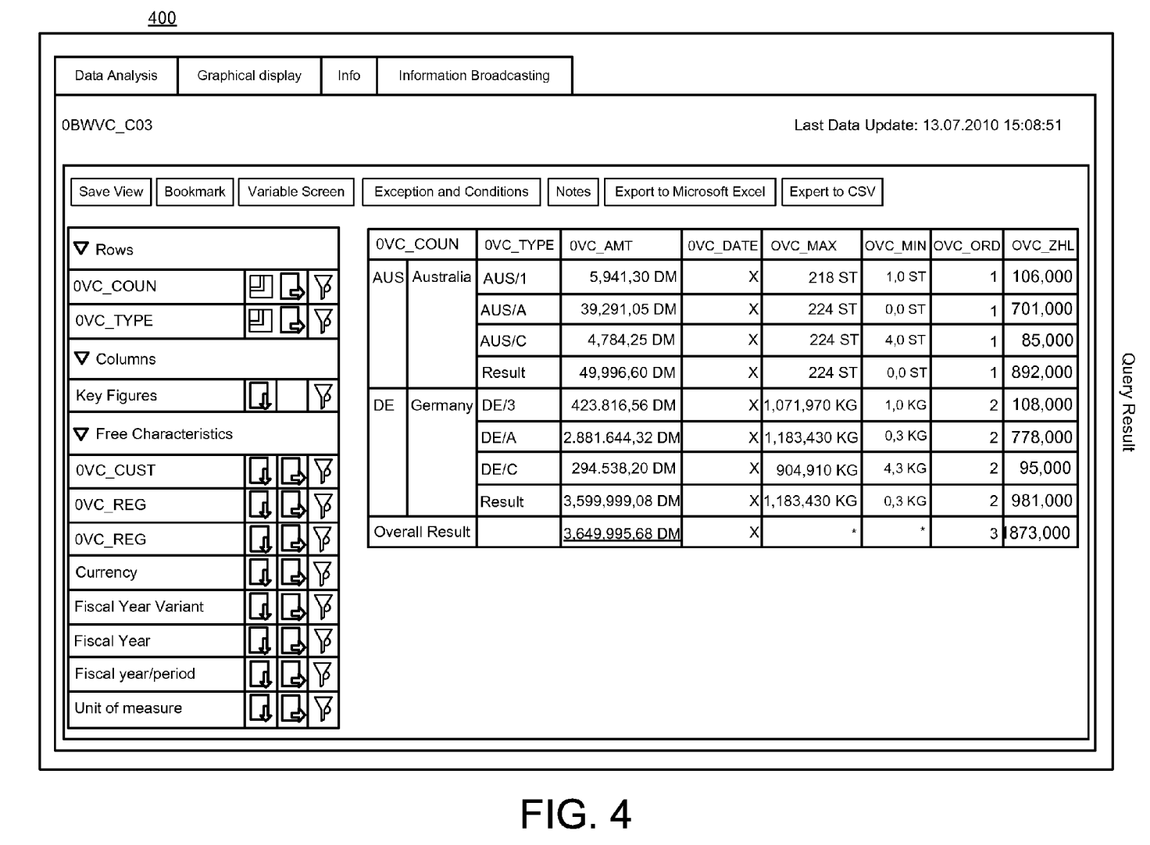
FIG. 4 is a diagram illustrating an example of a query result.

FIG. 3 is a process flow illustrating a more detailed example method 300 for integrating software layers in an OLAP system utilizing an OLAP engine, such as the OLAP system 104 of FIG. 1 utilizing the OLAP engine 108.

In the example of FIG. 3, the OLAP engine 108 uses an application structure 302 (i.e., a dynamic result set structure) passed down from the application layer 110 through other software layers (e.g., the OLAP data consumer layer 112 and the OLAP data provider layer 114). In an aspect, if each layer in the OLAP stack supports the dynamic result sets, then the structure may be defined within the application of the application layer 110 and passed down layer by layer to the OLAP engine 108. When the OLAP engine 108 reads the raw data acquired from the database 106 via the abstraction layer 116, the OLAP engine 108 may enhance the acquired raw data by OLAP entities and then store the enhanced data immediately into the received application structure (i.e., dynamic result set structure). The OLAP engine 108 may enhance the raw data with OLAP entities to include information related to one or more of hierarchies, aggregation, and exceptions. The OLAP engine 108 is configured to provide an OLAP result set 310 with a private area 312 (e.g., a left part of the OLAP result set) and an application specific area 314 (e.g., a right part of the OLAP result set). The application specific area 314 needs not to be copied from layer to layer, and only its reference to a filled application table may be passed up to the application in the application layer 110, which in turn displays the data directly on the UI target layer 102.

In an aspect of the disclosure, one or more references to one or more memory locations for data elements in the result set (i.e., dynamic result set structure) are passed by the OLAP engine 108 to the application layer 110 via one or more other software layers (e.g., 112 and/or 114) for retrieving or acquiring each data element associated with each corresponding reference in the result set (i.e., dynamic result set structure). In an implementation, the one or more references point to the aggregated result set of the OLAP engine 108. The application layer 110 may display the retrieved or acquired data directly to the UI target layer 102 in a report type of format or some variation thereof, as shown for example as a query result 400 in FIG. 4.

In various implementations, all layers in the OLAP stack support dynamic result set structures. A template structure for the dynamic result set structure may be created dynamically by the application in the application layer 110. A description document may be created dynamically by the application in the application layer 110 to instruct the filling instance for the OLAP Engine 108 on the structure semantics. There are no system boundaries between layers such that, for example, there is no need for copy operations and/or transformation operations between layers.

In accordance with aspects of the disclosure, data is enhanced once by the OLAP engine 108, and data is never copied or transformed between layers, and only references are passed between layers. The result set exists only once in memory plus the raw data. As such, transformations are not needed in the present system and methods therefor. The technique of looping over raw data is replaced with a technique by which enhancing dynamic structure fields significantly reduces query processing time.

In the example of FIG. 3, the OLAP stack may be referred to as a layered structure with separation of content between each software layer. For instance, content separation may exist between the layer for the OLAP data consumer 112 and the layer for the OLAP data provider 114. The dynamic result set structure provides a means for an anticipated representation of result set data that may be known by each layer. The result dataset is presented to the UI target layer 102, which may be referred to as the uppermost layer in the OLAP stack. The raw data is obtained from the database source layer 106, which may be referred to as the lowermost layer in the OLAP stack. As shown in FIG. 3, the anticipated representation of the result dataset (i.e., an application structure such as the dynamic result set structure) may be pushed or passed down from the application layer 110, thru one or more software layers (e.g., OLAP data consumer 112 and/or OLAP data provider 114), to the OLAP engine 108 to reduce query processing or execution time. Further, as shown in FIG. 3, a semantic representation of the result dataset (e.g., reference to a filled application table) is returned to the application layer 110 by being passed up from the OLAP engine 108, thru one or more software layers (e.g., the OLAP data consumer 112 and/or the OLAP data provider 114), to the application layer 110 for direct display in the target layer 102, for example, as shown by the formatted query result 400 in FIG. 4. As further shown in the example of FIG. 3, the OLAP engine 108 is configured to provide the OLAP result dataset (i.e., dynamic result set structure) with a private area 302 and an application specific area 304. In an aspect of the disclosure, the OLAP engine 108 only passes a reference to a filled application table to the application in the application layer 110 for direct display on the UI target layer 102.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An engine system for an Online Analytical Processing (OLAP) system including instructions recorded on a non-transitory computer-readable storage medium and executable by at least one processor, the system comprising:
   a request handler configured to cause the at least one processor to receive, at the engine system, a dynamic result set structure passed from an application layer via one or more other software layers, the dynamic result set structure having a description of entities for a target layer;

a data handler configured to cause the at least one processor to enhance raw data acquired from a database associated with a source layer based on the description of entities for the dynamic result set structure; and a response handler configured to cause the at least one processor to pass one or more references to one or more memory locations for data elements in the dynamic result set structure to the application layer via the one or more other software layers for acquiring each data element associated with each corresponding reference in the dynamic result set structure.

2. The system of claim 1, wherein the data handler is further configured to cause the at least one processor to:
acquire the raw data from the database associated with the source layer via an abstraction layer; and
store the enhanced raw data in the one or more memory locations of the database associated with the dynamic result set structure.

3. The system of claim 1, wherein each data element of the dynamic result set structure exists only once in memory of the database.

4. The system of claim 1, wherein the enhanced raw data of the dynamic result set structure comprises a private area.

5. The system of claim 1, wherein the enhanced raw data of the dynamic result set structure comprises an application specific area including the reference to the memory location for each data element in the dynamic result set structure.

6. The system of claim 1, wherein the data elements of the dynamic result set structure comprise multidimensional transactional data elements.

7. The system of claim 1, wherein the description of entities include information related to OLAP entities associated with the OLAP system including one or more of data hierarchies, data aggregations, and data exceptions.

8. The system of claim 1, wherein each software layer in the OLAP system supports the dynamic result set structure.

9. The system of claim 1, wherein no boundaries exist between the software layers of the OLAP system.

10. A computer program product, the computer program product being tangibly embodied on a non-transitory computer-readable storage medium and comprising instructions that, when executed by at least one processor, are configured to:
receive, at an engine system, a dynamic result set structure passed from an application layer via one or more other software layers, the dynamic result set structure having a description of entities for a target layer;
enhance raw data acquired from a database associated with a source layer based on the description of entities for the dynamic result set structure; and
pass one or more references to one or more memory locations for data elements in the dynamic result set structure to the application layer via the one or more other software layers for acquiring each data element associated with each corresponding reference in the dynamic result set structure.

11. The computer program product of claim 10, further comprising instructions that, when executed by the processor, are configured to:
acquire the raw data from the database associated with the source layer via an abstraction layer; and
store the enhanced raw data in the one or more memory locations of the database associated with the dynamic result set structure.

12. A computer-implemented method for integrating a plurality of software layers in an Online Analytical Processing (OLAP) system, comprising:

receiving, at an engine system, a dynamic result set structure passed from an application layer via one or more other software layers, the dynamic result set structure having a description of entities for a target layer;
enhancing raw data acquired from a database associated with a source layer based on the description of entities for the dynamic result set structure; and
passing one or more references to one or more memory locations for data elements in the dynamic result set structure to the application layer via the one or more other software layers for acquiring each data element associated with each corresponding reference in the dynamic result set structure.

13. The method of claim 12, further comprising:
acquiring the raw data from the database associated with the source layer via an abstraction layer; and
storing the enhanced raw data in the one or more memory locations of the database associated with the dynamic result set structure.

14. The method of claim 12, wherein the receiving the dynamic result set structure includes receiving instructions for a filling instance on semantics for the dynamic result set structure.

15. The method of claim 12, wherein:
the receiving the dynamic result set structure passed from the application layer via one or more other software layers comprises receiving the dynamic result set structure passed from the application layer via at least one of a consumer layer and a provider layer, and
the passing the one or more references to the application layer via the one or more other software layers comprises passing the one or more references to the application layer via at least one of the consumer layer and the provider layer.

16. The method of claim 12, further comprising:
storing the enhanced raw data in the one or more memory locations of the database associated with the dynamic result set structure so that each data element of the dynamic result set structure exists only once in memory of the database.

17. The method of claim 12, further comprising:
storing the enhanced raw data in the one or more memory locations of the database associated with the dynamic result set structure so that the enhanced raw data of the dynamic result set structure comprises a private area.

18. The method of claim 12, further comprising:
storing the enhanced raw data in the one or more memory locations of the database associated with the dynamic result set structure so that the enhanced raw data of the dynamic result set structure comprises an application specific area including the reference to the memory location for each data element in the dynamic result set structure.

19. The method of claim 12, wherein:
the data elements of the dynamic result set structure comprise multidimensional transactional data elements, and
the description of entities include information related to OLAP entities associated with the OLAP system including one or more of data hierarchies, data aggregations, and data exceptions.

20. The method of claim 12, wherein:
each software layer in the OLAP system supports the dynamic result set structure, and no boundaries exist between the software layers of the OLAP system.

* * * * *